Patented Nov. 8, 1927.

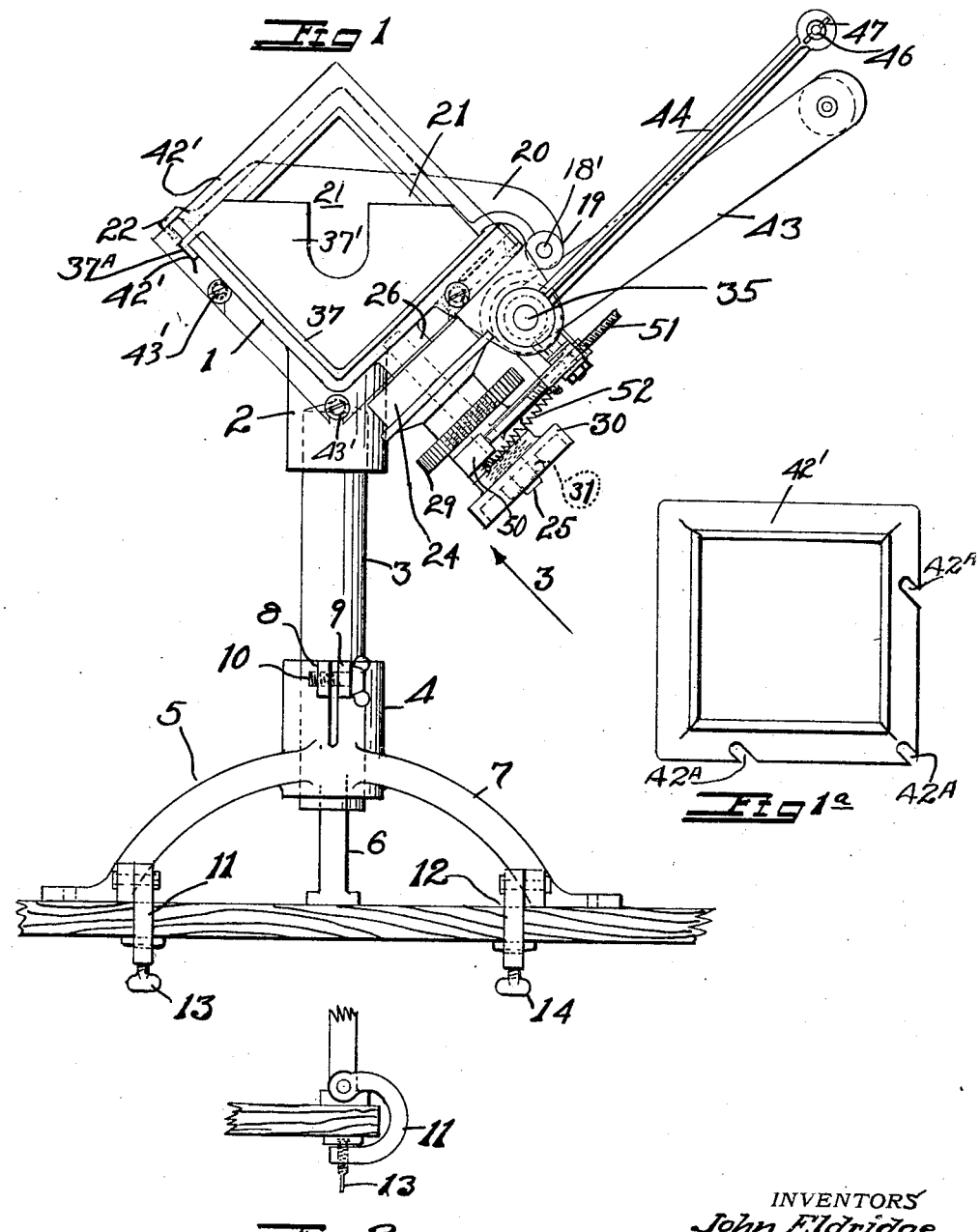

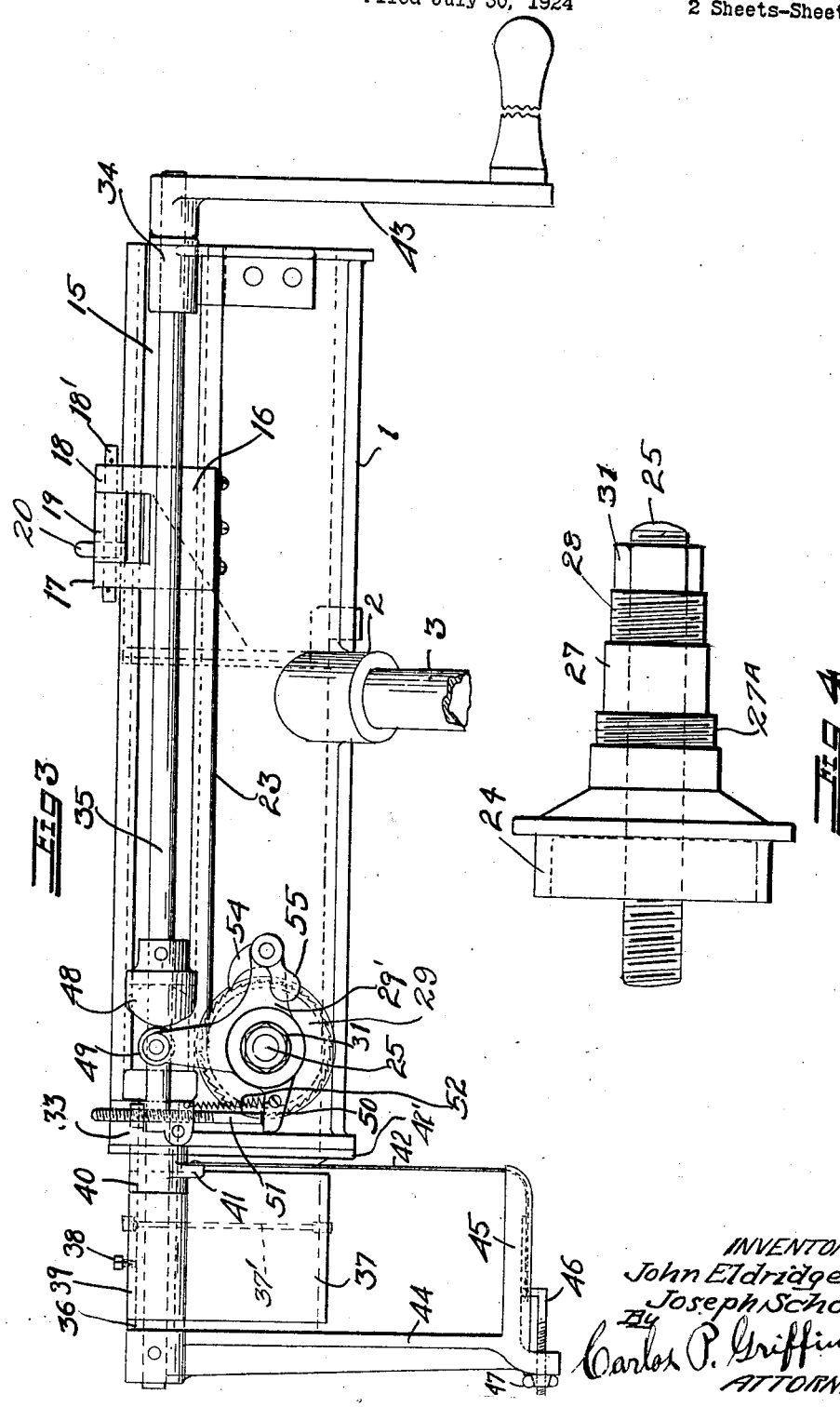

1,648,611

UNITED STATES PATENT OFFICE.

JOHN ELDRIDGE, OF OAKLAND, AND JOSEPH SCHOR, OF SAN FRANCISCO, CALIFORNIA; IDA MADELINE ELDRIDGE ADMINISTRATRIX OF THE SAID JOHN ELDRIDGE, DECEASED.

CHEESE CUTTER.

Application filed July 30, 1924. Serial No. 729,076.

This invention relates to a cheese cutter, especially adapted to slice the well known form of brick cheese ordinarily shipped in five pound squares, and its object is to provide means whereby the cheese may be smoothly sliced.

It will be understood that this kind of cheese is rather gummy and very difficult to slice with a knife, so that in the present instance a wire is used to cut the cheese, means being provided for the accumulation of the cut slices upon a suitable holder until a sufficient number of slices have been cut to make it necessary to remove them from the apparatus.

Another object of the invention is to provide means whereby the thickness of the slice may be varied within certain limits as may be required.

Other objects of the invention will appear as the description proceeds.

An embodiment of the invention is shown in the accompanying drawings, in which the same reference numeral is applied to the same portion throughout, but I am aware that there may be modifications thereof.

Figure 1 is an end view of the complete machine.

Figure 1^A is a side elevation of the cutting die used.

Figure 2 is a side elevation of the clamp for securing the machine to a table.

Figure 3 is a view of the cheese supporting trough looking in the direction of the arrow 3 Figure 1.

Figure 4 is a side elevation of the winding drum, showing the threads thereon for holding the pawl wheel and bell crank in place.

The slicer comprises a V shaped trough 1 with a depending lug which is bored to receive the supporting shank 3. The supporting shank passes into a hub 4 connected to three supporting legs 5, 6, 7.

The hub 4 is split and provided with two lugs 8 and 9 through which a screw 10 passes to enable the hub 4 to be tightened on the shank 3 with the cutter at any desired level.

The legs 5 and 7 are provided with the clamp members 11 and 12 to enable the apparatus to be secured to any desired shelf for its operation; screws 13 and 14 enabling the cutter to be tightly secured in any desired place.

On the back of one side of the trough is a groove 15 which groove receives and holds the slide 16; said slide having ears 17 and 18 by which the slide is connected to a boss 19 on an arm 20 of the plate 21 for pushing the cheese along the trough when the slices are cut. The follower plate 21 is connected to the slide 16 by means of a pin 18'.

In order to prevent the plate 21 from lifting, it is provided with a hook 22, which passes over the outer edge of the trough 1.

A steel tape 23 is connected to the under side of the slide 16 and passes around a drum 24; said drum being mounted on a fixed shaft 25 projecting from a boss 26 on the under side of the trough 1.

The winding drum is provided with a sleeve as indicated in Figure 4, which is threaded at 27^a, turned smooth at 27 and threaded at 28; the object being to screw the pawl wheel 29 into place on the threads 27^a and to loosely mount the bell crank 29' on the surface 27, while it is held in place by means of a threaded knob 30. The entire assembly thus produced is secured on the stub shaft 25 by means of a nut 31. Secured to the side of the trough 1 are two bearings 33, 34, in which the shaft 35 rotates.

The bearing 33 also holds a fixed tube 36 which tube acts as a support for the shelf 37, said shelf being held in a fixed position by means of the set screw 38 passing through the boss 39 on one side of the shelf 37, which boss passes around the tube 36.

The slices are held upright by means of a follower plate 37', which plate has a hook 37^A embracing the upper edge of the trough 37 and which follower plate is pushed outwardly by the cut slices.

Loosely mounted on the tube 36 between the boss 39 and bearing 33 is a small collar 40 which has a short lug 41 on one side to be connected to one end of the cheese cutting wire 42.

In order to provide a cutting edge for the wire 42 to operate against, there is a rectangular frame 42', which is secured to the end of the trough 1 by suitable screws 43' and said frame has three slots 42^A into which the screws pass and which allow the frame to be dismounted without removing said screw.

Rigidly connected to one end of the shaft 35 is a crank 43 and at the opposite end, also rigidly connected thereto, is an arm 44. It has an arm 45 extending toward the crank end of the shaft; said arm being for the purpose of holding the wire 42 which is stretched by means of the threaded bolt 46 and wing nut 47 and which arm passes over the shelf 37 so that an accumulation of slices is carried upon said shelf.

Rigidly connected to the shaft 35 between its two bearings is a cam 48 arranged so that its operating face will engage a small roller 49 on one arm of the bell crank 29'. The bell crank also has an additional arm 50 which is held normally engaged with the adjusting bolt 51 by means of a spring 52.

The bell crank also carries a pawl 54, to which is attached the weight 55 to hold the pawl in engagement with the pawl wheel 29.

The operation of the apparatus is as follows: Assuming a brick of cheese to be placed in the trough ahead of the follower plate 21, the operator turns the crank, which in turn causes the operation of the bell crank lever 29'. This will advance the follower plate by winding up the steel tape 23 until the brick of cheese is pushed ahead far enough for the wire to cut a slice therefrom. When one slice has been cut the brick of cheese will be advanced to the thickness of a slice with each rotation of the crank 43 and the cut slices will accumulate on the shelf 37. The thickness of the slices will be adjusted by the position of the bolt 51, since it may be so arranged as to cause the cam 48 to just barely move the follower plate 21 or to make a thick cut as may be desired.

What we claim is as follows, but modifications may be made in carrying out the invention shown in the drawing and in the above particularly described form thereof within the purview of the invention as defined by the annexed claims.

1. In a slicing machine having a supporting trough for the material to be sliced, a revoluble shaft extending along one side of the trough, a crank at one end of the shaft, means to advance the material in the trough step-by-step as slices are cut therefrom, and means to change the amount of said advance to cut the slices the required thickness, the combinationn of a slice holder adjacent the end of said trough, an arm at the other end of the shaft adapted to pass around the slice holder, and a cutting wire carried by said arm, said wire passing between the trough and the slice holder.

2. In a slicing machine having a supporting trough for the material to be sliced, a revoluble shaft extending along one side of the trough, and a crank at one end of the shaft, the combination of a tube fixed in the end of the trough and in which the shaft revolves, a slice holder mounted on said tube, a loose collar on said tube between the slice holder and the trough, an arm carried by the shaft to pass around the slice holder, and a cutting wire carried between said arm and said loose collar and adapted to turn with the arm.

3. In a slicing machine having a supporting trough for the material to be sliced, bearings arranged on said trough, a revoluble shaft extending along one side of the trough and mounted in said bearings, an operating crank on one end of the shaft, and adjustable means to advance the body of material in the trough step-by-step as the slices are cut therefrom, the combination of a slice holder adjacent the end of the trough, a fixed tube carried by the shaft bearing adjacent the slice holder and on which the slice holder is mounted, a loose collar on said tube, an arm on the shaft adapted to pass around the slice holder, and a cutting wire secured at one end to the loose collar and at the other end to said arm.

4. In a slicing machine having a material supporting trough provided with bearings on one side thereof, a revoluble shaft mounted in said bearings, a crank at one end of the shaft, and means to advance the material in the trough step-by-step as slices are cut therefrom, the combination of a slice holder adjacent one end of the trough, an arm carried by the shaft adapted to pass around the slice holder, a tube fixed in one of the shaft bearings and on which the slice holder is mounted, a loose collar on said tube, a cutting wire secured at one end to said collar and at the other end held by said arm, and means on said arm for tensioning said wire.

5. In a slicing machine having a material supporting trough, a revoluble shaft extending along one side of the trough and having a bearing at each end of the trough, a crank on one end of the shaft, an arm carrying a cutting wire on the other end of said shaft, the combination of a drum mounted on said trough adapted to wind up a tape, a ratchet wheel adapted to turn said drum, a bell crank lever, one arm of which carries a pawl engaging the teeth of said wheel, the other arm having a roller adapted to engage a cam on the shaft, a stop on said bell crank lever, an adjustable screw, a spring on said lever adapted to hold said stop against said screw, and a sliding follower plate connected to the free end of said tape whereby a step-by-step movement of the material in the trough is had as the slices are cut therefrom, the length of each step being controlled by the adjustable screw.

6. In a slicing machine having a support for the material to be sliced, a revoluble shaft journaled on the support, and a cutting element carried on the shaft and arranged to rotate therewith across the end of the support to slice the material thereon, the combination of a slice holder mounted on the support.

7. In a slicing machine having a support for the material to be sliced, a revoluble shaft journaled on the support, and a cutting element carried on the shaft and arranged to rotate therewith across the end of the support to slice the material thereon, the combination of a bracket extending from said support and within which the shaft revolves, and a slice holder fixed on said bracket.

8. In a slicing machine having a support for the material to be sliced, a revoluble shaft journaled on the support, and means for turning the shaft, the combination of a bracket extending from said support and within which the shaft revolves, a loose collar on said bracket, an arm fixed on said shaft, a cutting element carried between said arm and said collar, and a slice holder fixed on said bracket.

9. A slicing machine comprising a trough for holding the material to be sliced, a shaft journaled on said trough, an arm mounted on said shaft, a cutting element spaced from the arm and connected therewith for rotation across the end of said trough, a pusher actuated by the shaft for advancing the material in the trough to the cutting element, a slice stacker comprising a short trough mounted between the cutting element and the arm in alinement with the material holding trough, and a backing plate in said stacker.

In testimony whereof we have hereunto set our hands this 24th day of July, A. D. 1924.

JOHN ELDRIDGE.
JOSEPH SCHOR.